(12) United States Patent
Liu et al.

(10) Patent No.: US 12,485,071 B2
(45) Date of Patent: Dec. 2, 2025

(54) PERSONAL CARE COMPOSITION WITH VISUALLY DISTINCT AQUEOUS AND OIL PHASE

(71) Applicant: Conopco, Inc., Englewood Cliffs, NJ (US)

(72) Inventors: Lanhua Liu, Shanghai (CN); Chandersekar Loganathan, Shanghai (CN); Qiang Qiu, Easton, CT (US); Yang Zhang, Shanghai (CN)

(73) Assignee: Conopco, Inc., Hoboken, NJ (US)

( * ) Notice: Subject to any disclaimer, the term of this patent is extended or adjusted under 35 U.S.C. 154(b) by 318 days.

(21) Appl. No.: 17/918,353

(22) PCT Filed: Apr. 21, 2021

(86) PCT No.: PCT/EP2021/060317
§ 371 (c)(1),
(2) Date: Oct. 12, 2022

(87) PCT Pub. No.: WO2021/228519
PCT Pub. Date: Nov. 18, 2021

(65) Prior Publication Data
US 2023/0142042 A1 May 11, 2023

(30) Foreign Application Priority Data

May 9, 2020 (WO) ................ PCT/CN2020/089332
Jun. 18, 2020 (EP) .................................... 20180662

(51) Int. Cl.
*A61K 8/03* (2006.01)
*A61K 8/34* (2006.01)
*A61K 8/42* (2006.01)
*A61K 8/58* (2006.01)
*A61K 8/67* (2006.01)
*A61Q 19/08* (2006.01)

(52) U.S. Cl.
CPC ................ *A61K 8/03* (2013.01); *A61K 8/345* (2013.01); *A61K 8/42* (2013.01); *A61K 8/585* (2013.01); *A61K 8/671* (2013.01); *A61Q 19/08* (2013.01); *A61K 2800/262* (2013.01); *A61K 2800/87* (2013.01); *A61K 2800/882* (2013.01)

(58) Field of Classification Search
CPC . A61K 8/03; A61K 8/31; A61K 8/585; A61K 8/42
See application file for complete search history.

(56) References Cited

U.S. PATENT DOCUMENTS

| 3,810,478 | A | 5/1974 | Olson, Jr. et al. |
| 4,826,828 | A | 5/1989 | Wilmott et al. |
| 4,888,363 | A | 12/1989 | Dulak et al. |
| 4,992,265 | A | 2/1991 | Davis et al. |
| 5,599,548 | A | 2/1997 | Granger et al. |
| 5,811,110 | A | 9/1998 | Granger et al. |
| 5,880,314 | A | 3/1999 | Shinomiya et al. |
| 11,389,382 | B2 | 7/2022 | Chen et al. |
| 2003/0165546 | A1 | 9/2003 | Resch et al. |
| 2005/0238680 | A1 | 10/2005 | Stella et al. |
| 2006/0008438 | A1 | 1/2006 | Velarde et al. |
| 2006/0078524 | A1 | 4/2006 | Midha et al. |
| 2006/0078527 | A1 | 4/2006 | Midha et al. |
| 2006/0079417 | A1 | 4/2006 | Wagner et al. |
| 2006/0210612 | A1 | 9/2006 | Simon et al. |
| 2007/0009446 | A1 | 1/2007 | Romero |
| 2007/0117729 | A1 | 5/2007 | Taylor et al. |
| 2008/0299058 | A1 | 12/2008 | Saito et al. |
| 2009/0196836 | A1 | 8/2009 | Tanner et al. |
| 2010/0068307 | A1 | 3/2010 | Nielloud |
| 2011/0082217 | A1 | 4/2011 | Johnson et al. |
| 2012/0276177 | A1 | 11/2012 | Hilliard, Jr. et al. |
| 2013/0251644 | A1 | 9/2013 | Majhi et al. |
| 2014/0147525 | A1 | 5/2014 | de Paula et al. |
| 2016/0256367 | A1 | 9/2016 | Charbit |
| 2016/0324869 | A1 | 11/2016 | Wei et al. |
| 2017/0087064 | A1 | 3/2017 | Ikeda et al. |
| 2018/0161259 | A1 | 6/2018 | Ha et al. |
| 2018/0177695 | A1 | 6/2018 | Miller et al. |
| 2018/0360705 | A1 | 12/2018 | Alam et al. |
| 2019/0142706 | A1* | 5/2019 | Sverdlove et al. ...... A61K 8/03 |

FOREIGN PATENT DOCUMENTS

| CN | 1377403 | 10/2002 |
| CN | 1237898 | 1/2006 |
| CN | 1946375 | 4/2007 |
| CN | 103202775 | 7/2013 |
| CN | 104640534 | 5/2015 |
| CN | 106580755 | 4/2017 |
| CN | 107997996 | 5/2018 |

(Continued)

OTHER PUBLICATIONS

Ma Zhenyou; Manual of Cosmetic Preparations for Skin Beauty; Publishing House of Traditional Chinese Medical Books; Jan. 31, 2015; pp. 471-472, with English translation.
Leszek Marszall; Messungen des effektiven HLB-Wertes nichtionogener Tenside mittels Phenol-Titrationsmethode; Parfumerie und Kosmetik; 1979; pp. 444-448—with English translation; vol. 60; Germany.
Dr. Otto-Albrecht Neumuller; Franck'sce Verlagshandlung, Stuttgart; Rompps Chemie-Lexikon; 1983; pp. 1750-1751, with English translation; 8th Edition; Germany.
Search Report and Written Opinion in EP20180662; Dec. 14, 2020; European Patent Office (EPO).
Database GNPD (Online) Mintel; Once and No Makeup 2-Phase Make-up Remover; Nature.Med Tonik; Sep. 2017; pp. 1-3, Record ID 5111633, XP055754195; Ukraine.

(Continued)

*Primary Examiner* — Robert A Wax
*Assistant Examiner* — Kimberly Barber
(74) *Attorney, Agent, or Firm* — Stephanie Huang

(57) ABSTRACT

Disclosed is a multi-phase personal care composition comprising an aqueous phase, and an oil phase comprising volatile silicone, fatty acid amide and retinoid, wherein the aqueous phase is visually distinct from and in physical contact with the oil phase.

19 Claims, No Drawings

(56) References Cited

FOREIGN PATENT DOCUMENTS

| | | | | |
|---|---|---|---|---|
| CN | 108367179 | 8/2018 | | |
| CN | 108524322 | 9/2018 | | |
| CN | 109248102 | 1/2019 | | |
| CN | 109310591 | 2/2019 | | |
| CN | 111000735 | 4/2020 | | |
| DE | 2358822 | 6/1975 | | |
| DE | 9216886 | 4/1994 | | |
| DE | 19501184 | 7/1996 | | |
| DE | 102013226276 | * | 7/2014 | ............... A61K 8/03 |
| EP | 1676560 | 7/2006 | | |
| FR | 2252403 | 6/1975 | | |
| FR | 2645740 | 10/1990 | | |
| FR | 2835430 | 8/2003 | | |
| JP | S62135404 | 6/1987 | | |
| JP | H01294615 | 11/1989 | | |
| JP | H11209235 | 8/1999 | | |
| JP | 200095721 | 4/2000 | | |
| JP | 2002284626 | 3/2001 | | |
| JP | 2002255739 | 9/2002 | | |
| JP | 2010280593 | 12/2010 | | |
| JP | 2011001270 | 1/2011 | | |
| JP | 2015229634 | 12/2015 | | |
| WO | WO8606275 | 11/1986 | | |
| WO | WO9622072 | 7/1996 | | |
| WO | WO0123514 | 4/2001 | | |
| WO | WO2005105033 | 11/2005 | | |
| WO | WO2006042176 | 4/2006 | | |
| WO | WO2014013420 | 1/2014 | | |
| WO | WO2017110151 | 6/2017 | | |
| WO | WO2017220310 | 12/2017 | | |
| WO | WO2018114232 | 6/2018 | | |
| WO | WO2019011619 | 1/2019 | | |
| WO | WO2021228492 | 11/2021 | | |
| WO | WO2021228502 | 11/2021 | | |
| WO | WO2021228503 | 11/2021 | | |

OTHER PUBLICATIONS

Database GNPD (Online) Mintel; Renew & Repair Solution; Beauty Drops; Mar. 2019; pp. 1-5, Record ID 6432731, XP055754197; Spain.
Search Report and Written Opinion in EP20180664; Dec. 14, 2020; European Patent Office (EPO).
Search Report and Written Opinion in PCTEP2021060141; Jul. 7, 2021; World Intellectual Property Org. (WIPO).
Database GNPD (Online) Mintel; Bouncy Skin Kit; Glow Recipe; Jun. 2020; pp. 1-6, Record ID 7904250, XP055754204; United Kingdom.
Database GNPD (Online) Mintel; VitaC Glycolic Brightening Serum; Murad Environmental Shield; Mar. 2020;pp. 1-6, Record 7452259, XP055754208; .; United States of America.
Search Report and Written Opinion in PCTEP2021059985; Jul. 7, 2021; World Intellectual Property Org. (WIPO).
Search Report and Written Opinion in EP20180677; Dec. 14, 2020; European Patent Office (EPO).
Search Report and Written Opinion in EP20180672; Dec. 14, 2020; European Patent Office (EPO).
Search Report and Written Opinion in PCTEP2021060317; Jul. 5, 2021; World Intellectual Property Org. (WIPO).
Search Report and Written Opinion in PCTEP2021060140; Jul. 5, 2021; World Intellectual Property Org. (WIPO).
IPRP2 in PCTEP2021060140; Apr. 25, 2022; World Intellectual Property Org. (WIPO).
Written Opinion 2 in PCTEP2021060141; Apr. 25, 2022; World Intellectual Property Org. (WIPO).
IPRP2 in PCTEP2021060141; Jun. 24, 2022; World Intellectual Property Org. (WIPO).
Written Opinion 2 in PCTEP2021060317; Mar. 31, 2022; World Intellectual Property Org. (WIPO).
IPRP2 in PCTEP2021060317; May 10, 2022; World Intellectual Property Org. (WIPO).
IPRP2 in PCTEP2021059985; May 17, 2022; World Intellectual Property Org. (WIPO).
Written Opinion 2 in PCTEP2021059985; Mar. 24, 2022; World Intellectual Property Org. (WIPO).
Database GNPD (Online) Mintel; Oil Shaker Dual Phase Refining Oil; Decorté Phytotune; Sep. 2019; pp. 1-3, Record ID 6874605; Japan.
Database GNPD (Online) Mintel; Biphase Make-Up Remover; Vinésime Racine du Temps; May 2019; pp. 1-3, Record ID 6494461; France.
Database GNPD (Online) Mintel; Anti/Oxi+ Clarifying Gentle Cleansing Oil in Water; Shu Uemura Skin Purifier; Nov. 2018; pp. 1-4, Record ID 6118721; Japan.
Database GNPD (Online) Mintel; Eye Makeup Remover; Neutrogena Deep Clean; Sep. 2016; pp. 1- 2, Record ID 4277647; Greece.
Database GNPD (Online) Mintel; Biphasic Hydrating Cleansing; Violetta Rostro y Ojos; Mar. 2015; pp. 1-2, Record ID 3046791; Argentina.

* cited by examiner

PERSONAL CARE COMPOSITION WITH VISUALLY DISTINCT AQUEOUS AND OIL PHASE

CROSS REFERENCE TO RELATED APPLICATIONS

The present application is a U.S. National Phase Application under 35 U.S.C. § 371 of International Application No. PCT/EP2021/060317, filed on Apr. 21, 2021, which claims priority to International Application No. PCT/CN2020/089332, filed on May 9, 2020, and European Patent Application No. 20180662.7, filed on Jun. 18, 2020, the contents of which are incorporated herein in their entireties.

FIELD OF THE INVENTION

The present invention relates to a multi-phase personal care composition. In particular, the present invention relates to a multi-phase personal care composition comprising an aqueous phase, and an oil phase comprising volatile silicone and retinoid, wherein the composition comprises fatty acid amide and the aqueous phase is visually distinct from and in physical contact with the oil phase.

BACKGROUND OF THE INVENTION

Retinoids (e.g. retinol and retinyl esters) are common ingredients used in personal care products. Retinol (vitamin A) is an endogenous compound which occurs naturally in the human body and is essential for normal epithelial cell differentiation. Natural and synthetic vitamin A derivatives have been used extensively in the treatment of a variety of skin disorders and have been used as skin repair or renewal agents. Retinoic acid has been employed to treat a variety of skin conditions, e.g., acne, wrinkles, psoriasis, age spots and discoloration.

Sometimes, instability is a problem for retinoids, typically the result of in situ oxidation. This results in a product that may processes a malodour and/or is tainted with discoloration. It could even result in a non-stable composition with oxidised compounds that do not necessarily have a positive impact on skin.

It is of increasing interest to develop a stable skin composition containing retinoids. Multi-phase composition is one of the solutions. By including the retinoid into the oil phase, the oxidation may be reduced.

However, when we developed a multi-phase personal care composition, it was unexpectedly found that it caused skin sensitization to the consumer within 24 hours. We have recognised that there remains a need to develop a multi-phase personal care composition containing retinoid but having less/no sensitization. It was surprisingly found that the skin sensitization is significantly reduced by including volatile silicone into the multi-phase person care composition.

SUMMARY OF THE INVENTION

In a first aspect, the present invention is directed to a multi-phase personal care composition comprising an aqueous phase, and an oil phase comprising volatile silicone and retinoid, wherein the composition comprises fatty acid amide and the aqueous phase is visually distinct from and in physical contact with the oil phase.

In a second aspect, the present invention is directed to kit of parts comprises a cosmetic container, a multi-phase personal care composition of the present invention and instruction for use of the kit.

In a third aspect, the present invention is directed to a method for preparing a personal care product comprising the step of shaking a cosmetic container containing multi-phase personal care composition of the present invention by human hand.

In a fourth aspect, the present invention is directed to a method for providing skin lightening to skin of an individual comprising the steps of (i) shaking a cosmetic container containing composition of any one of claims 1 to 10 by human hand and (ii) topically applying the resulting product.

All other aspects of the present invention will more readily become apparent upon considering the detailed description and examples which follow.

DETAILED DESCRIPTION OF THE INVENTION

Except in the examples, or where otherwise explicitly indicated, all numbers in this description indicating amounts of material or conditions of reaction, physical properties of materials and/or use may optionally be understood as modified by the word "about".

All amounts are by weight of the composition, unless otherwise specified.

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

Where a feature is disclosed with respect to a particular aspect of the invention (for example a composition of the invention), such disclosure is also to be considered to apply to any other aspect of the invention (for example a method of the invention) mutatis mutandis.

"Visually distinct" as used herein refers the regions occupied by each phase can be separately seen by human eye as distinctly separate regions in contact with one another (i.e., they are not emulsions or dispersions of particles of less than 100 microns).

"Multi-phase" as used herein refers to that at least two phases occupy separate and distinct physical spaces inside the container in which they are stored, but are in direct contact with one another (i.e., they are not separated by a barrier).

"Transparent" as used herein refers to that at least 70%, preferably at least 80%, more preferably at least 85% of light, having wavelength of 550 nm transmits a 1 cm thick of sample, measured by a UV-vis spectrometer (e.g. Perkin-Elmer Lambda 650S) at 25° C. "Opaque" as used herein refers to that no greater than 50%, preferably no greater than 30% of light transmits by same method.

"Viscosity" as used herein means kinematic viscosity at 25° C. and is reported as centiStokes (1 cSt=1 mm2·s−1). Viscosity of fluids such as silicone can be determined, for example, by the relevant international standard, such as ISO 3104.

The composition of the present invention comprises a retinoid. Typically, the retinoid is selected from retinyl ester, retinol, retinal, retinoic acid or a mixture thereof. More preferably the retinoid comprises retinol, retinyl ester, or a mixture thereof and even more preferably the retinoid is selected from retinol, retinyl ester, or a mixture thereof.

The term "retinol" includes the following isomers of retinol: all-trans-retinol, 13-cis-retinol, 11-cis-retinol, 9-cis-retinol, 3,4-didehydro-retinol, 3,4-didehydro-13-cis-retinol; 3,4-didehydro-11-cis-retinol; 3,4-didehydro-9-cis-retinol. Preferred isomers are all-trans-retinol, 13-cis-retinol, 3,4-didehydro-retinol, 9-cis-retinol. Most preferred retinol is all-trans-retinol, due to its wide commercial availability.

Retinyl ester is an ester of retinol. The term "retinol" has been defined above. Retinyl esters suitable for use in the present invention are preferably $C_1$-$C_{30}$ esters of retinol, more preferably $C_2$-$C_{20}$ esters of retinol, and most preferably $C_2$, $C_3$, and $C_{16}$ esters of retinol. Examples of retinyl esters include but are not limited to: retinyl palmitate, retinyl formate, retinyl acetate, retinyl propionate, retinyl butyrate, retinyl valerate, retinyl isovalerate, retinyl hexanoate, retinyl heptanoate, retinyl octanoate, retinyl nonanoate, retinyl decanoate, retinyl undecanoate, retinyl laurate, retinyl tridecanoate, retinyl myristate, retinyl pentadecanoate, retinyl heptadecanoate, retinyl stearate, retinyl isostearate, retinyl nonadecanoate, retinyl arachidonate, retinyl behenate, retinyl linoleate, retinyl oleate. The retinyl ester for use in the present invention is preferably selected from retinyl palmitate, retinyl acetate, retinyl linoleate, retinyl oleate, retinyl propionate or a mixture thereof. More preferably the retinyl ester is selected from retinyl palmitate, retinyl acetate, retinyl propionate, or a mixture thereof. Most preferably the retinyl ester is selected from retinyl palmitate, retinyl propionate, or a mixture thereof.

Particularly preferred retinoid is selected from all-trans-retinol, retinyl palmitate, retinyl acetate, retinyl propionate, or a mixture thereof. Most preferably the retinoid is selected from retinyl palmitate, retinyl propionate, or a mixture thereof.

Preferably, retinoid is employed in the composition in an amount of 0.0001% to 8% by weight of the composition, more preferably in an amount of 0.001% to 4%, even more preferably from 0.01% to 1.5% and most preferably in an amount of 0.1% to 0.6% by weight of the composition.

The term "volatile silicone" is understood to mean a liquid polyorganosiloxane having a measurable vapor pressure at 25° C. and atmospheric pressure, preferably ranging from 0.13 Pa to 40 000 Pa, more preferably ranging from 1.3 Pa to 5 000 Pa and most preferably ranging from 10 Pa to 1300 Pa.

Preferably, the volatile silicone contains 2 to 15, more preferably 3 to 10 silicon atoms. Volatile silicone can be linear or cyclic or mixtures thereof. Preferred cyclic silicone include polydimethylsiloxanes and particularly those containing from 3 to 9 silicon atoms and preferably not more than 7 silicon atoms and most preferably from 4 to 6 silicon atoms, otherwise often referred to as cyclomethicones. Preferred linear siloxanes include polydimethylsiloxanes containing from 3 to 9 silicon atoms.

The viscosity of volatile silicone is typically from 0.01 to 100 cSt (centi-Stokes) at 25° C., preferably from 0.1 cSt to 20 cSt, more preferably from 0.2 to 10 cSt.

The volatile silicone is preferably cyclopentasiloxane. The volatile silicone is preferably selected from octamethylcyclotetrasiloxane, decamethylcyclopentasiloxane, dodecamethylcyclohexasiloxane, heptamethylhexyltrisiloxane, heptamethyloctyltrisiloxane, hexamethyldisiloxane, octamethyltrisiloxane, decamethyltetrasiloxane, dodecamethylpentasiloxane, or a mixture thereof. More preferably, the volatile silicone is selected from decamethylcyclopentasiloxane, dodecamethylcyclohexasiloxane. Most preferably the volatile silicone is decamethylcyclopentasiloxane.

Examples of commercially available silicone include silicone having grade designations 344, 345, 244, 245 and 246 from Dow Corning Corporation; Silicone 7207 and Silicone 7158 from Union Carbide Corporation; and SF1202 from General Electric.

The amount of the volatile silicone is preferably in the range of 3 to 60%, more preferably from 8 to 55%, even more preferably from 15 to 50%, still even more preferably from 25 to 45%, most preferably from 28 to 42% by weight of the total amount of the composition. The amount of the volatile silicone is preferably in the range of 10 to 98%, more preferably from 25 to 95%, even more preferably from 35 to 92%, still even more preferably from 45 to 80%, most preferably from 55 to 75% by weight of the total amount of the oil phase.

Preferably, the weight ratio of the volatile silicone to the retinoid is from 10:1 to 1000:1, more preferably 20:1 to 500:1 and most preferably 50:1 to 300:1.

Preferably, the composition comprises a non-ionic surfactant. Preferably, the non-ionic surfactant comprises: a) the condensation products of aliphatic alcohols having from 8 to 22 carbon atoms in either straight or branched chain configuration with ethylene oxide, such as a coconut alcohol/ethylene oxide condensates having from 2 to 15 moles of ethylene oxide per mole of coconut alcohol; b) condensates of alkylphenols having $C_6$-$C_{15}$ alkyl groups with 5 to 25 moles of ethylene oxide per mole of alkylphenol; c) polyoxyethylene sorbitan fatty acid esters, for example polyoxyethylene sorbitan $C_6$-$C_{24}$ fatty acid esters; d) alkyl glucoside, or a mixture thereof. More preferably the nonionic surfactant is alkyl glucoside. Alkyl glucoside as used herein includes alkyl polyglucosides.

Preferred alkyl glucoside is represented by formula of RO-(G)$_n$, wherein R is a branched or straight chain alkyl group which may be saturated or unsaturated, G is a saccharide group, and the degree of polymerisation, n, may have a value of from 1 to 10; Preferably R has a mean alkyl chain length of from $C_5$ to $C_{20}$, G is selected from $C_5$ or $C_6$ monosaccharide residues and n has a value of from 1 to 6; more preferably R has a mean alkyl chain length of from $C_6$ to $C_{16}$, G is glucose and n has a value of from 1 to 6.

Preferably, the amount of the non-ionic surfactant is 0.0001 to 15%, more preferably 0.001 to 10%, even more preferably 0.01 to 6%, still even more preferably 0.1 to 5%, and most preferably 1 to 4% by weight of the composition.

More preferably the composition comprises fatty acid amide. Preferably, the fatty acid amide contains at least 6 carbon atoms. Suitable fatty acids include saturated and unsaturated, straight or branched fatty acids. Suitable fatty acids preferably contain from 8 to 24 carbon atoms, preferably from 12 to 20 carbon atoms, and most preferably from 12 to 18 carbon atoms, because longer chain fatty acid amides are more beneficial for conditioning of the skin. In the most preferred embodiment of the invention, amides of essential fatty acids are employed because essential fatty acids provide nutrition for the skin. Examples of essential fatty acids include but are not limited to linoleic, linolenic, arachidonic, gamma-linolenic, homo-gamma-linolenic, and mixtures thereof. Linoleic acid is most preferred because it is also a precursor to ceramide.

Amides suitable for use in the present invention may be simple amides (i.e., those containing a —$CONH_2$ group), N-alkyl amides, N, N-dialkyl amides, mono-alkanol amides, and di-alkanol amides. Suitable alkyl or alkanol groups contain from 1 to 30 carbon atoms, preferably from 1 to 20 carbon atoms, and most preferably from 1 to 8 carbon atoms. The preferred amides included in the present invention are mono- and di-alkanol amides, particularly of essential fatty acids. Alkanol amides are more commonly available than alkyl amides.

The preferred fatty acid amides are selected from mono- and diethanolamides of linoleic acid, palmitic acid, and coconut oil.

The fatty acid amide may be included in an amount ranging from 0.0001% to 10%, preferably from 0.01% to 4%, most preferably from 0.1% to 1% by weight of the total amount of the composition.

Preferably, the composition comprises triglyceride. More preferably, the composition comprises caprylic/capric triglyceride, coconut oil, sunflower seed oil, safflower oil, cottonseed oil, olive oil or a mixture thereof. Particularly preferred triglyceride is caprylic/capric triglyceride. Preferably, the amount of triglyceride is 0.001 to 12%, more preferably 0.1 to 8%, even more preferably 0.5 to 5% by weight of the composition.

Preferably, the composition comprises polyhydric alcohol. Polyhydric alcohols may be selected from group of propylene glycol, dipropylene glycol, polypropylene glycol, polyethylene glycol, sorbitol, hydroxypropyl sorbitol, hexylene glycol, 1,3-butylene glycol, isoprene glycol, ethoxylated glycerol, propoxylated glycerol or a mixture thereof. Most preferred polyhydric alcohol is glycerol known also as glycerin. The amount of polyhydric alcohol may range anywhere from 5 to 35%, preferably 8 to 25% and more preferably 12 and 18% by weight of the composition.

The composition may comprise water in amount of 10 to 90% by weight of the composition, more preferably from 15 to 78%, even more preferably from 20 to 65%, most preferably from 25 to 50% by weight of the composition.

The composition may comprise resorcinol derivative. Resorcinol derivative preferably refers to that at least one hydrogen on the ring structure and/or on a hydroxy group of the resorcinol replaced with an alkyl group, phenyl alkyl group. Preferably, the resorcinol derivative is 4-substituted resorcinol. Preferably, the resorcinol derivative is selected from 4-ethyl resorcinol, 4-butyl resorcinol, 4-hexyl resorcinol, phenylethyl resorcinol, or a mixture thereof, and more preferably, the resorcinol derivative comprises 4-hexyl resorcinol.

The amount of the resorcinol derivative is preferably in the range of 0.00001 to 10%, more preferably from 0.001 to 5% and most preferably from 0.1 to 0.6% by weight of the total amount of the composition.

The composition may comprise optional ingredients including moisturizing agent, skin lightening agent, preservatives, antioxidants, colorants, fragrance, or a combination thereof.

Vitamin B3 compounds (including derivatives of vitamin B3) e.g. niacin, nicotinic acid or niacinamide are the preferred skin lightening agent as per the invention, most preferred being niacinamide.

Preferably, the composition is a bi-phase liquid composition. Preferably, both the aqueous and oil phases are transparent. Preferably The weight ratio of the aqueous phase to the oil phase is preferably in the range of 1:8 to 8:1, more preferably 1:4 to 4:1, and even more preferably 1:2 to 2:1.

The multi-phase personal care composition can be provided to a consumer in any suitable way, but it is preferable that the composition is provided inside a cosmetics container. The cosmetics container preferably has a volume of 2 to 250 mL, more preferably 5 to 100 mL, even more preferably 8 to 60 mL and still even more preferably 10 to 50 mL.

Preferably a kit of parts comprises a cosmetic container, a multi-phase personal care composition according to the invention and instruction for use of the kit. Preferably, the instruction comprises the step of mixing aqueous phase with the oil phase by any suitable way, for example by shaking the container by human hand for at least 1 seconds, preferably 2 seconds to 5 minutes, more preferably 3 seconds to 1 minutes. Thus, a homogeneous personal care product is formed. Preferably the personal care product is opaque.

Preferably, the multi-phase personal care composition is capable of generating a personal care product by shaking the cosmetic container by human hand, preferably for 1 second to 5 minutes, more preferably 1 second to 1 minutes. Preferably, the personal care product is capable of recovering to be a multi-phase personal care composition by standing for 3 minutes to 20 hours, more preferably 10 minutes to 7 hours, and even more preferably 15 minutes to 4 hours.

Preferably, the personal care composition (product) is a skin care composition (product). The skin care composition (product) refers to a composition (product) suitable for topical application to human skin, preferably is a leave-on product. The term "leave-on" as used with reference to compositions herein means a composition that is applied to or rubbed on the skin, and left thereon. The term "skin" as used herein includes the skin on the face (except eye lids and lips), neck, chest, abdomen, back, arms, under arms, hands, and legs. Preferably "skin" means includes the skin on the face (except eye lids and lips) and under arms, more preferably skin means skin on the face other than lips and eyelids.

The following examples are provided to facilitate an understanding of the invention. The examples are not intended to limit the scope of the claims.

EXAMPLES

Example 1

This example demonstrates the preparation of multi-phase skin care composition.

TABLE 1

| | | Samples (wt %)* | | |
| --- | --- | --- | --- | --- |
| Phase | Ingredient | A | B | 1 |
| Aqueous | Water | To 100 | To 100 | To 100 |
| | Glycerin | 15.00 | 15.00 | 15.00 |
| | Cocamide MEA | 0.25 | 0.25 | 0.25 |
| | Capryl/caprylyl Glucoside | 1.24 | 1.24 | 1.24 |
| | Niacinamide | 3.00 | 3.00 | 3.00 |
| | Disodium EDTA | 0.05 | 0.05 | 0.05 |
| | Preservative | 0.66 | 0.66 | 0.66 |
| | Sodium Chloride | 0.60 | 0.60 | 0.60 |
| | Colorant | 0.00151 | 0.00151 | 0.00151 |
| Oil | Decamethylcyclopentasiloxane | — | — | 38.57 |
| | Isohexadecane | 38.57 | 29.10 | — |
| | Isopropyl Myristate | — | 9.47 | — |
| | Tocopheryl Acetate | 1.00 | 1.00 | 1.00 |
| | Retinol Propionate | 0.33 | 0.33 | 0.33 |
| | Fragrance | 0.10 | 0.10 | 0.10 |
| | Colorant | 0.0003 | 0.0003 | 0.0003 |

*The level of the ingredients refers the level of active.

The samples in Table 1 were prepared by mixing Cocamide MEA at a temperature of 50 to 60° C., cooling down to room temperature, and adding other ingredients to get the aqueous phase. The ingredients for oil phase were mixed together to get the oil phase. The sample were obtained by mixing the aqueous phase and oil phase.

Example 2

This example demonstrates the effect of type of oil on the skin sensitization.

The samples A, 1 and 2 were prepared as described in Example 1. A blind patch test was conducted on the back skin of a group of at least 30 consumers. 0.02 mL of samples was placed onto placed into the chamber of patch. The test area are photographed and then the patch with test sample was attached onto the test area. After 24 hours, the condition of test area was recorded by camera again. The skin sensitization was evaluated and Table 2 shows the numbers of consumers having different reactions.

TABLE 2

| Sample | Number of consumers | | | |
|---|---|---|---|---|
| | L0 | L1 | L2 | L3 |
| A | 1 | 14 | 15 | 0 |
| B | 11 | 17 | 2 | 0 |
| 1 | 30 | 0 | 0 | 0 |

L0: negative; L1: suspicious reaction with only weak erythema; L2: weak positive reaction including erythema, infiltration, edema, or papules; L3: strong positive reaction or the reaction exceeded the tested area.

As shown in Table 2, the problem of skin sensitization caused by the multi-phase composition comprising retinoid was unexpectedly solved by including volatile silicone into the multi-phase composition.

The invention claimed is:

1. A multi-phase personal care composition comprising:
    (a) an aqueous phase, and
    (b) an oil phase comprising volatile silicone and retinoid, wherein the composition comprises fatty acid amide and the aqueous phase is visually distinct from and in physical contact with the oil phase; and
wherein the volatile silicone to the retinoid is present in a weight ratio of from 10:1 to 1000:1.

2. The multi-phase personal care composition according to claim 1,
    wherein the retinoid is selected from retinyl ester, retinol, retinal and retinoic acid.

3. The multi-phase personal care composition according to claim 1,
    wherein the retinoid is present in amount of 0.00001 to 10% by weight of the total amount of the composition.

4. The multi-phase personal care composition according to claim 1,
    wherein the volatile silicone contains 3 to 10 silicon atoms.

5. The multi-phase personal care composition according to claim 1,
    wherein the amount of the volatile silicone is in the range of 3 to 60% by weight of the total amount of the composition.

6. The multi-phase personal care composition according to claim 1,
    wherein the fatty acid amide is in amount of 0.01% to 4% by weight of the composition.

7. The multi-phase personal care composition according to claim 1,
    wherein the composition comprises nonionic surfactant.

8. The multi-phase personal care composition according to claim 1,
    wherein both the aqueous phase and oil phase are transparent.

9. The multi-phase personal care composition according to claim 1,
    wherein the aqueous phase to the oil phase is present in a weight ratio of 1:8 to 8:1.

10. Kit of parts comprising a cosmetic container, the multi-phase personal care composition according to claim 1, and instructions for use of the kit.

11. A method for preparing a personal care product comprising a step of shaking a cosmetic container containing the multi-phase personal care composition according to claim 1, by human hand.

12. A method for providing skin lightening to skin of an individual comprising the steps of (i) shaking a cosmetic container containing the multi-phase personal care composition according to claim 1, by human hand and (ii) topically applying the resulting product.

13. The multi-phase personal care composition according to claim 1, wherein the retinoid comprises retinyl ester, retinol, or a mixture thereof, and wherein the retinoid is present in amount of 0.001 to 5% by weight of the total amount of the composition.

14. The multi-phase personal care composition according to claim 1, wherein the retinoid comprises retinyl palmitate, retinyl propionate, or a mixture thereof, and wherein the retinoid is present in amount of 0.1 to 0.6% by weight of the total amount of the composition.

15. The multi-phase personal care composition according to claim 4, wherein the volatile silicone is decamethylcyclopentasiloxane.

16. The multi-phase personal care composition according to claim 5, wherein the amount of the volatile silicone is in the range of 28 to 42% by weight of the total amount of the composition.

17. The multi-phase personal care composition according to claim 7, wherein the the composition comprises alkyl glucoside.

18. The multi-phase personal care composition according to claim 9, wherein the aqueous phase to the oil phase is present in a weight ratio of 1:2 to 2:1.

19. A multi-phase personal care composition comprising:
    (a) an aqueous phase, and
    (b) an oil phase comprising volatile silicone and retinoid, wherein the composition comprises fatty acid amide and the aqueous phase is visually distinct from and in physical contact with the oil phase; and
wherein the volatile silicone to the retinoid is present in a weight ratio of from 50:1 to 300:1.

* * * * *